US008863022B2

(12) United States Patent
Rhodes et al.

(10) Patent No.: US 8,863,022 B2
(45) Date of Patent: Oct. 14, 2014

(54) PROCESS MANAGEMENT VIEWS

(75) Inventors: Christina L. Rhodes, Kirkland, WA (US); Mark Yalovsky, Seattle, WA (US); Rolf A. Ebeling, Kirkland, WA (US); John Corey Morgan, Duvall, WA (US); Shawn M. Woods, Seattle, WA (US); Ryan M. Hurst, Woodinville, WA (US); Jonathan M. Au, Redmond, WA (US); Peter Seraphim Ponomarev, Seattle, WA (US); Jason C. Hendrickson, Seattle, WA (US); Hemchand Alla, Allen, TX (US); Yau N. Chin, Bellevue, WA (US); Stuart Sechrest, Redmond, WA (US); Mehmet Iyigun, Bellevue, WA (US); Yevgeniy Bak, Redmond, WA (US); Ishfaq M. Ismail, Sammamish, WA (US); Jeffrey C. Fuller, Redmond, WA (US); Prashant Ratanchandani, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 151 days.

(21) Appl. No.: 13/227,023

(22) Filed: Sep. 7, 2011

(65) Prior Publication Data
US 2013/0061167 A1    Mar. 7, 2013

(51) Int. Cl.
*G06F 3/048* (2013.01)
(52) U.S. Cl.
USPC .......... 715/781; 715/810; 715/772; 714/47.1; 714/46

(58) Field of Classification Search
USPC ................ 715/781, 810, 772; 714/47.1, 46
See application file for complete search history.

(56) References Cited

U.S. PATENT DOCUMENTS

| | | | | |
|---|---|---|---|---|
| 5,636,376 | A * | 6/1997 | Chang | 717/127 |
| 6,148,335 | A * | 11/2000 | Haggard et al. | 709/224 |
| 6,850,257 | B1 * | 2/2005 | Colleran et al. | 715/804 |
| 6,954,934 | B2 * | 10/2005 | Kumar | 719/317 |
| 7,032,186 | B1 | 4/2006 | Gasser et al. | |
| 7,549,087 | B2 * | 6/2009 | Cummins et al. | 714/38.14 |

(Continued)

OTHER PUBLICATIONS

Noraziah, et al., "System Memory Monitoring through Windows Application Programming Interface", Retrieved at <<http://ieeexplore.ieee.org/stamp/stamp.jsp?arnumber=04664372>>, First International Conference on the Applications of Digital Information and Web Technologies, Aug. 4-6, 2008, pp. 354-359.

(Continued)

*Primary Examiner* — Weilun Lo
*Assistant Examiner* — Rashedul Hassan
(74) *Attorney, Agent, or Firm* — Sung Kim; Andrew Sanders; Wolfe-SBMC

(57) ABSTRACT

Two different process management views can be displayed, and a user can request to switch between the two views. The user can select a process in either view and have the selected process terminated. One view is a simplified view that identifies processes and whether they are non-responsive. The other view is an expanded view that identifies processes and the amount of various system resources used by each of those processes. Various additional information can be displayed in the expanded view, such as identifiers of various windows, tabs, and/or services associated with each of the processes.

20 Claims, 10 Drawing Sheets

(56) References Cited

U.S. PATENT DOCUMENTS

| | | | |
|---|---|---|---|
| 7,555,719 B1* | 6/2009 | Yehuda et al. | 715/736 |
| 7,693,983 B1 | 4/2010 | Gupta et al. | |
| 7,827,476 B1* | 11/2010 | Roberts et al. | 715/204 |
| 8,429,630 B2 | 4/2013 | Nickolov et al. | |
| 2003/0006988 A1* | 1/2003 | Alford et al. | 345/440 |
| 2003/0236811 A1 | 12/2003 | Green et al. | |
| 2004/0267897 A1 | 12/2004 | Hill et al. | |
| 2005/0010660 A1 | 1/2005 | Vaught | |
| 2005/0028158 A1 | 2/2005 | Ferguson et al. | |
| 2005/0060663 A1 | 3/2005 | Arkeketa et al. | |
| 2006/0230321 A1* | 10/2006 | Cummins et al. | 714/46 |
| 2006/0230324 A1* | 10/2006 | Cummins et al. | 714/57 |
| 2007/0185909 A1 | 8/2007 | Klein et al. | |
| 2007/0220375 A1* | 9/2007 | Baz | 714/55 |
| 2008/0109753 A1* | 5/2008 | Karstens | 715/802 |
| 2008/0115131 A1 | 5/2008 | Kelsey et al. | |
| 2008/0163125 A1* | 7/2008 | Gu et al. | 715/853 |
| 2008/0196043 A1 | 8/2008 | Feinleib et al. | |
| 2008/0222437 A1 | 9/2008 | Sutardja et al. | |
| 2009/0030753 A1 | 1/2009 | Senturk-Doganaksoy et al. | |
| 2009/0031066 A1* | 1/2009 | Bansal et al. | 710/113 |
| 2010/0039433 A1 | 2/2010 | McGreevy et al. | |
| 2010/0268816 A1 | 10/2010 | Tarui et al. | |
| 2010/0275184 A1* | 10/2010 | Nir et al. | 717/125 |
| 2011/0055817 A1 | 3/2011 | Noble et al. | |
| 2011/0071867 A1 | 3/2011 | Chen et al. | |
| 2011/0145657 A1 | 6/2011 | Bishop et al. | |
| 2011/0191609 A1* | 8/2011 | Van Bokhoven et al. | 713/310 |
| 2012/0084413 A1* | 4/2012 | Pasternak | 709/221 |
| 2012/0262472 A1 | 10/2012 | Garr et al. | |
| 2012/0278658 A1* | 11/2012 | Han et al. | 714/38.1 |
| 2013/0061162 A1* | 3/2013 | Rhodes et al. | 715/771 |
| 2013/0067378 A1 | 3/2013 | Au et al. | |
| 2013/0111386 A1 | 5/2013 | Rhodes et al. | |

OTHER PUBLICATIONS

"Auslogics Task Manager Description", Retrieved from: <http://www.softpedia.com/get/System/System-Info/Auslogics-Task-Managers.html> on Jun. 16, 2011,(Jun. 1, 2011), 2 pages.

"Bandwidth Monitoring Tools for Linux", Retrieved from: <http://www.ubuntugeek.com/bandwidth-monitoring-tools-for-linux.html> on Jun. 16, 2011,(Mar. 28, 2007), 15 pages.

"Netconnect Meter", Retrieved from: <http://www.jaysonjc.com/projects/netconnect-meter> on Jun. 16, 2011, 3 pages.

"Network Traffic Monitoring", Retrieved from: <http://www.monitortools.com/traffic/> on Jun. 16, 2011, 17 pages.

"Task Manager", Retrieved from: <http://sourcedaddy.com/windows-7/task-manager.html> on Jun. 16, 2011, 3 pages.

"Understanding Node List, Heat Map, and Custom Tab Views", *Microsoft TechNet*, retrieved from <http://technet.microsoft.com/en-us/library/ff919399(WS.10).aspx> on Nov. 8, 2011,(Jun. 21, 2011), 3 pages.

Gregg, Brendan "Visualizing System Latency", *Communications of the ACM*, available at <http://delivery.acm.org/10.1145/1810000/1809426/p30-gregg.pdf?ip=203.8.109.15&acc=OPEN&CFID=67521831&CFTOKEN=87946092&_acm_=1320744520_8e047fbd12097dee1d42b62ca61963fd>,(Jul. 2010), 13 pages.

Kevin "Compare Performance Attributes through Heat Charts", retrieved from <http://blogs.manageengine.com/appmanager/2010/05/10/compare-performance-attributes-through-heat-charts> on Nov. 8, 2011,(May 10, 2011), 3 pages.

"Non-Final Office Action", U.S. Appl. No. 13/229,592, (May 9, 2013),14 pages.

"Final Office Action", U.S. Appl. No. 13/229,592, (Jul. 31, 2013),16 pages.

"Non-Final Office Action", U.S. Appl. No. 13/345,482, Jul. 31, 2014, 14 pages.

"Non-Final Office Action", U.S. Appl. No. 13/229,592, May 28, 2014, 18 pages.

* cited by examiner

PROCESS MANAGEMENT VIEWS

BACKGROUND

Modern computers typically are able to execute numerous programs in parallel. This can result in various problems, such as reduced computer performance due to the number of programs or behavior of a particular program, reduced performance due to a program no longer operating correctly, reduced performance due to the behavior of multiple processes and their impact on one another, and so forth. To resolve these problems, users sometimes desire to terminate execution of a particular program that does not appear to be the top contributor to a problem in the hopes that freeing up resources will help another program (e.g., which can use those freed resources). However, user interfaces allowing users to terminate programs tend to be overly complicated, which can make it difficult for a user to accurately select the appropriate program to terminate in order to resolve the problem he or she is having.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first process management view is displayed on a device. The first process management view displays process identifiers of multiple processes on the device, and for each of the multiple processes that is not responding an indication that the process is not responding. A user request to have a second process management view displayed is received. In response to the user request, a second process management view is displayed. The second process management view displays the process identifiers of the multiple processes, for each of the multiple processes that is not responding an indication that the process is not responding, and for each of multiple resources of the device a usage of the resource by each of the multiple processes.

In accordance with one or more aspects, one or more processes running on a device are identified. Additionally, for one of the one or more processes, one or more windows related to the one process are identified. In a first process management view, process identifiers of the one or more processes are displayed, and for each of multiple resources of the device a resource usage by each of the one or more processes is displayed. Additionally, for the one process, in the first process management view identifiers of the one or more windows are displayed as associated with the process identifier of the one process.

BRIEF DESCRIPTION OF THE DRAWINGS

The same numbers are used throughout the drawings to reference like features.

DETAILED DESCRIPTION

Process management views are discussed herein. A user can select from two different process management views, and can readily switch between the two views, thus providing a single place for users to go to solve problems regardless of the skill level of the user. The user can select a process in either view and have the selected process terminated. One view is a simplified view that identifies processes (e.g., as application names) and their status (e.g., whether they are non-responsive). The other view is an expanded view, which is an expanded version of the simplified view that identifies processes, the amount of various resources used by each of those processes, and the status of those processes (e.g., not responsive, waiting for user, suspended, etc.). Identifiers of various windows, tabs, and/or services associated with each of the processes are also displayed, allowing the user to readily identify what will cease executing if the process is terminated. The expanded view can also include various indicators to assist the user in identifying potential problems, such as color-coding resource usage indications for different processes, highlighting the resource that is most likely to be the cause of slow performance, and so forth. As both novice and expert users typically desire to terminate processes from time to time, but the level of technical understanding differs greatly between novice and expert users, the process management views discussed herein addresses these separate skill levels.

Figure 1:
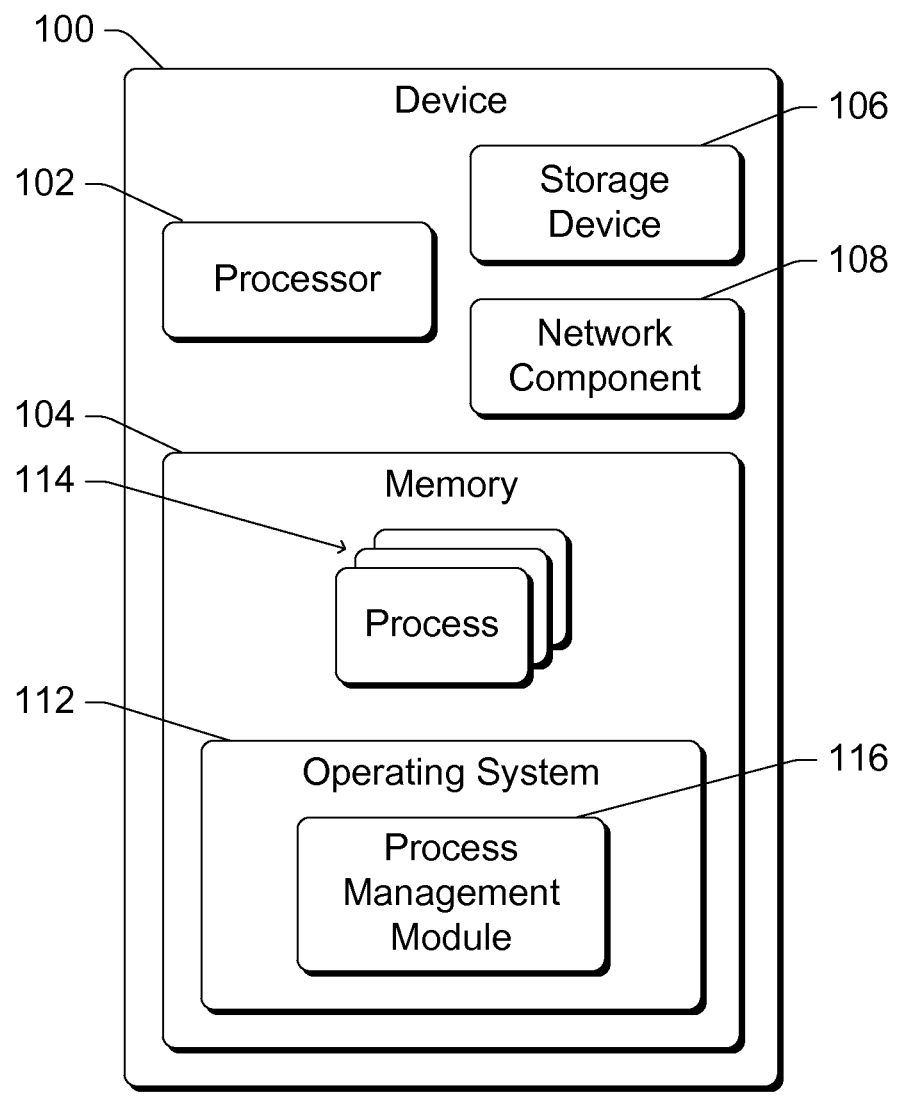
FIG. 1 is a block diagram illustrating an example device implementing the process management views in accordance with one or more embodiments.

FIG. 1 is a block diagram illustrating an example device 100 implementing the process management views in accordance with one or more embodiments. Device 100 can be a variety of different types of devices, such as a physical device or a virtual device. For example, device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Device 100 can also be a virtual device, such as a virtual machine running on a physical device. A virtual machine can be run on any of a variety of different types of physical devices (e.g., any of the various types listed above). Thus, device 100 may range from a full resource device with substantial memory and processor resources (e.g., personal computers, game consoles) to a low-resource device with limited memory and/or processing resources (e.g., traditional set-top boxes, handheld game consoles).

Device 100 includes a processor 102, memory 104, storage device 106, and network component 108. Memory 104 can include volatile memory (e.g., random access memory (RAM)) and/or nonvolatile memory (e.g., Flash memory). Memory 104 stores instructions that are executed by processor 102. Storage device 106, such as a magnetic disk, solid state (Flash memory) disk, and so forth provides nonvolatile storage for applications and data. Network component 108 manages communication with other devices via a wired and/or wireless network.

Memory 104 includes an operating system 112 and one or more processes 114. Various different programs can be run on device 100 as processes 114, such as entertainment programs, gaming programs, resource programs, utility programs, productivity programs, and so forth. Operating system 112 manages running of processes 114, including launching processes 114 in response to user requests to run programs, and ceasing execution of processes 114 in response to user requests to terminate a process. In one or more embodiments, operating system 112 exposes an application programming interface (API) that can be invoked (e.g., by process management module 116 discussed below) to terminate a process. An identifier of the process to be terminated is provided as a parameter of the API, and in response operating system 112 terminates the process.

Operating system 112 includes a process management module 116 that obtains information regarding processes 114 running on device 100 as well as the resources of device 100 used by those processes 114. Process management module 116 also generates one or more process management views, including a simplified view and an expanded view as discussed in more detail below. These process management views are displayed or otherwise presented by module 116 via a user interface (UI). Various user inputs can also be provided via the UI using a variety of different input mechanisms, such as by pressing one or more keys of a keypad or keyboard of device 100, pressing one or more keys of a controller of device 100, pressing a particular portion of a touchpad or touchscreen of device 100, making a particular gesture on a touchpad or touchscreen of device 100, making a particular gesture on a controller of device 100, providing audible inputs to a microphone, making particular motions of hands or other body parts observed by an image capture component, and so forth. Through these various user inputs a user is able to select a particular button, portion of a display, menu option, and so forth. Although a single process management module 116 is illustrated in FIG. 1, it should be noted that the functionality of module 116 can alternatively be separated into multiple modules.

Process management module 116 displays, in the process management views, identifiers of processes running on device 100. Process management module 116 can identify which processes are running on device 100 in a variety of different manners. In one or more embodiments, process management module 116 obtains an indication of processes running on device 100 from another module or component of operating system 112 that monitors which processes are running on device 100. In other embodiments, process management module 116 accesses a database, event log, or other record (e.g., maintained by operating system 112) of the processes running on device 100 and obtains an indication of which processes are running on device 100 from this database, event log, or other record. A process running on device 100 refers to a process that has begun executing but has not been terminated or otherwise closed. Thus, a process can be running even though malfunctioning and not being executed, even though suspended or otherwise not scheduled for execution by processor 102, and so forth.

Typically, process management module 116 generates and displays a process management view in response to a user input requesting that the process management view be displayed. Alternatively, process management module 116 can generate and display a process management view in response to a variety of different events, such as a request from another component or module of device 100. In one or more embodiments, process management module 116 maintains a default management view and initially displays the default view when displaying a process management view. The default view is the most recently displayed one of the simplified view and the expanded view. Thus, if a user inputs a request to switch from displaying the simplified view to displaying the expanded view, module 116 maintains the expanded view as the default view. Accordingly, the next time process management module 116 displays a process management view, module 116 initially displays the expanded view.

Figure 2:
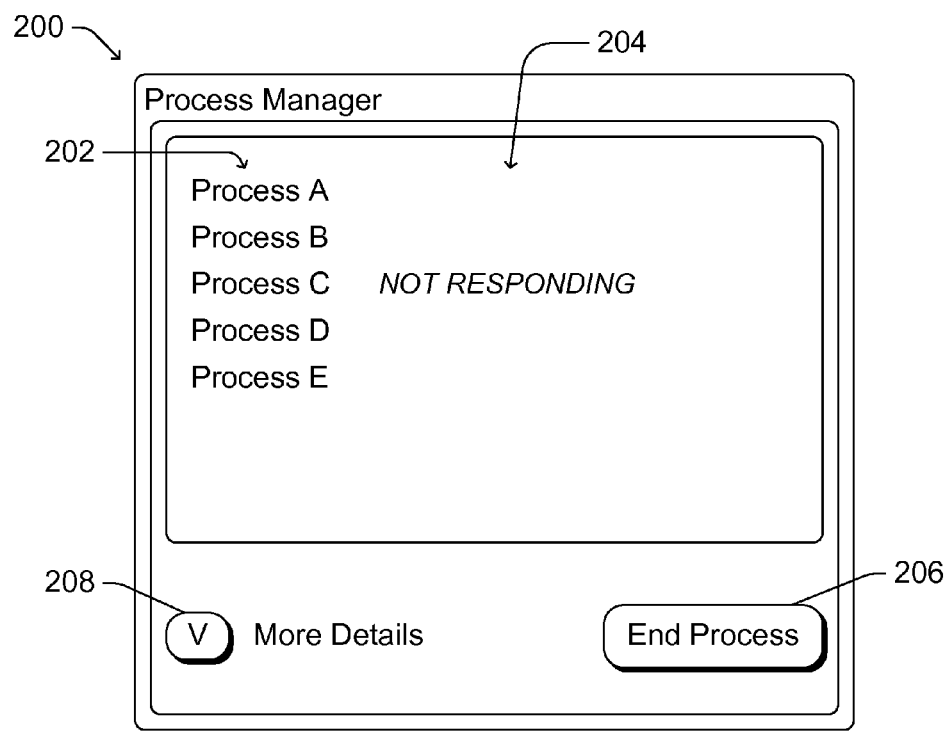
FIG. 2 illustrates an example simplified process management view in accordance with one or more embodiments.

FIG. 2 illustrates an example simplified process management view 200 in accordance with one or more embodiments. Simplified process management view 200 includes a list of identifiers 202 that identify different processes running on a device. A scroll bar or other scrolling mechanism (not shown) can optionally be included in simplified process management view 200 if there are more identifiers than can be displayed at one time in view 200. List of identifiers 202 typically includes names of the processes, and can additionally or alternatively include other process identifying information (such as icons). The identifiers 202 are typically user-friendly names of processes (e.g., application or program name), or other identifiers that are expected to be readily understood by a user.

Adjacent to list of identifiers 202 is list of status indications 204. Each status indication 204 corresponds to one of identifiers 202, and indicates the status of the process identified by the corresponding identifier. In one or more embodiments, the status is an indication that the process is running normally (e.g., having a value of "ok" or being left blank) or that the process is not running normally (e.g., having a value of "not responding"). Thus, in the example of FIG. 2, it can be seen that "Process C" is not running normally, and that the other processes are running normally. Alternatively, various other status indications could be included as status indications 204, such as "suspended" to indicate that the process is not being scheduled for execution, "waiting for a user" to indicate that the process is waiting for input from a user before proceeding, and so forth.

The status (e.g., running normally or not responding) can be determined by process management module 116 of FIG. 1 in a variety of different manners. In one or more embodiments, process management module 116 obtains an indication of the status of processes from another module or component of the operating system that monitors the status of the processes running on the device. In other embodiments, process management module 116 accesses a database, event log, or other record (e.g., maintained by the operating system) of the processes and their status and obtains the identification of the status of the various processes from this database, event log, or other record. In other embodiments, process management module 116 queries each process, requesting a response from the process. If the process does not return a response then the process is determined to be not responding, if the process responds by displaying a dialog requesting user input then the process is determined to be waiting for a user, and if the process returns a different response (rather than displaying a dialog requesting user input) then the process is determined to be responding.

In one or more embodiments, a user can select a process to terminate by providing a user input selecting the identifier of the process and then selecting an end task or end process button 206. Alternatively, the user can select a process to terminate based on simplified process management view 200 in a variety of other manners. For example, a user input double-tapping or double-clicking on a process identifier 202 can be a user input requesting that that process identifier 202 be terminated, a menu can be displayed in response to a user input selecting a process identifier 202 and a user input selecting a menu option to terminate the process can be received, and so forth. In response to a user request to terminate a process, the process management module (e.g., process management module 116 of FIG. 1) terminates the process.

Additionally, from simplified process management view 200 a user can request to view an expanded process management view in which additional details regarding resource usage in the device are displayed. A user request for the expanded process management view to be displayed can be received by the user selecting a more details or expanded view button 208. Alternatively, the user can request to view the expanded process management view by providing other inputs, such as by selecting a menu item, selecting an icon, and so forth. In response to a user request to view an expanded process management view, simplified process management view 200 is replaced by an expanded process management view.

Figure 3:
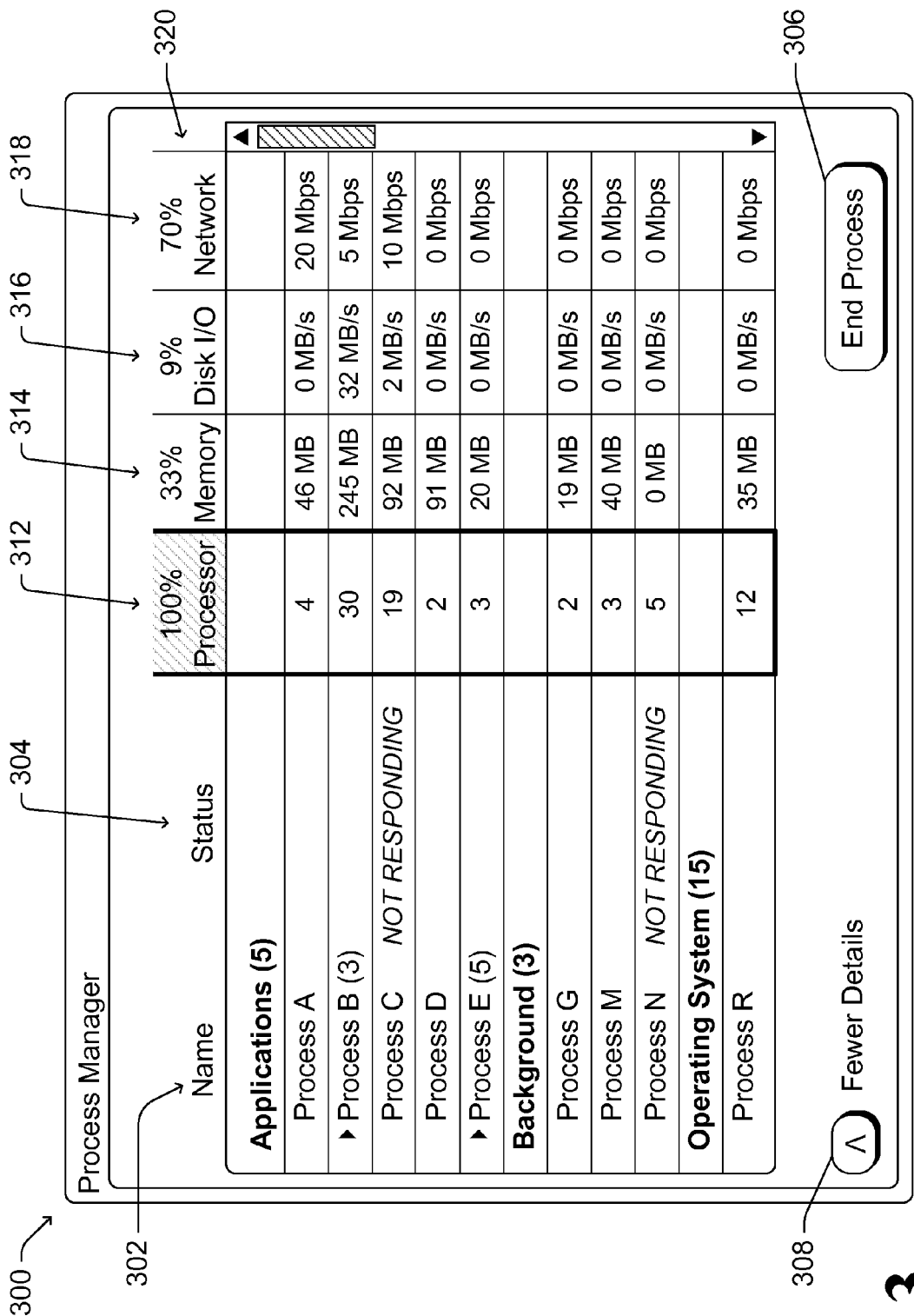
FIG. 3 illustrates an example expanded process management view in accordance with one or more embodiments.

FIG. 3 illustrates an example expanded process management view 300 in accordance with one or more embodiments. Expanded process management view 300 includes a list of identifiers 302 that identify different processes running on a device, analogous to list of identifiers 202 of FIG. 2. Adjacent to list of identifiers 302 is list of status indications 304, analogous to status indications 204 of FIG. 2. Various additional status indications can also be included as status indications 304, such as "suspended" to indicate that the process is not being scheduled for execution, "waiting for a user" to indicate that the process is waiting for input from a user before proceeding, and so forth. A scroll bar or other scrolling mechanism can optionally be included in expanded process management view 300 if there are more identifiers than can be displayed at one time in view 300.

Expanded process management view 300 includes an end task or end process button 306 that can be used to terminate a process analogous to button 206 of FIG. 2. Alternatively, a process to be terminated can be selected in other manners analogous to the discussion above regarding simplified process management view 200.

Additionally, from expanded process management view 300 a user can request to view a simplified process management view (e.g., simplified process management view 200 of FIG. 2). A user request to view the simplified process management view can be received by the user selecting a fewer details or simplified view button 308. Alternatively, the user can request to view the simplified process management view by providing other inputs, such as by selecting a menu item, selecting an icon, and so forth. In response to a user request to view a simplified process management view, expanded process management view 300 is replaced by a simplified process management view. Thus, the user can quickly switch back and forth between the simplified process management view and the expanded process management by requesting to view the appropriate one of the expanded process management view or simplified process management view.

In addition to status indications 304, expanded process management view 300 includes an indication of resource usage by each of the processes. This indication of resource usage can be an amount of resource usage and/or other indications as discussed in more detail below. Generally, a resource refers to a hardware, software, and/or firmware component of the device. For example, resources can include the processor or CPU of the device (e.g., processor 102 of FIG. 1), memory of the device (e.g., memory 104 of FIG. 1), disk (or other storage device) input/output (I/O) for the device (e.g., storage device 106 of FIG. 1), and a network component (e.g., network component 108 of FIG. 1). The usage of the processor resource refers to how much of the processing capacity of the processor is being used by the process (e.g., how much processor time the process is scheduled for). The usage of the memory resource refers to how much of the memory of the device is being used by the process (e.g., how much memory is allocated to the process, how much physical memory is being used by the process, how much memory is in a reference set of the process, and so forth). The usage of the disk I/O refers to an amount of data input to and/or output from the storage device by the process. The usage of the network refers to an amount of data sent and/or received via the network component by the process. Although resource usage for four different types of resources is discussed herein, it should be noted that resource usage for one or more of these types of resources may not be displayed. Additionally, it should be noted that resource usage for additional types of resources can also be displayed.

The resource usage can be displayed using the same data units for all resources. For example, resource usage can be displayed as a percentage of the particular resource, such as a percentage of resource capacity used (e.g., a percentage of the total available processor time), a percentage of the amount of the resource being used (e.g., a percentage of the total amount of data input to and/or output from the storage device by all processes, and so forth). Alternatively, different data units can be used for different resources with the particular data unit for a resource being dependent on the resource. For example, the data unit can be a percentage of the particular resource for the processor resource, a number of bytes for the memory resource, a number of bytes per second for the disk resource I/O resource, and a number of bits per second for the network resource. Additionally, data units can be scaled as appropriate (e.g., can show Kilobytes (KB), Megabytes (MB), Gigabytes (GB), and so forth as appropriate).

The resource usages are displayed in columns along with the list of process identifiers 302 and the list of status indications 304. Accordingly, included in expanded process management view 300 are processor (CPU) usage list 312, memory usage list 314, disk I/O usage list 316, and network usage list 318. Thus, for example, it can be readily seen from expanded process management view 300 that program C is using 19% of the processor resource, 92 Megabytes (MB) of the memory resource, 2 Megabytes per second (MB/s) of the disk I/O resource, and 10 Megabits per second (Mbps) of the network resource.

The usage of each resource by each process can be determined in a variety of different manners. In one or more embodiments, the operating system (e.g., operating system 112 of FIG. 1) includes one or more modules that track an amount of each resource used by each process. In such embodiments, process management module 116 obtains the amounts of resource usage by each process from these one or more modules. Alternatively, the usage of each resource by each process can be determined in other manners. For example, each individual resource or manager of the resource (e.g., processor scheduler, memory manager, disk controller, network controller, etc.) may track the amounts of usage of that resource by each process, and process management module can obtain the amounts of resource usage by each process from these individual resources or resource managers.

Regardless of how the amounts of resource usage are determined, the received amounts themselves can be displayed or alternatively used to calculate the value that is displayed. For example, process management module 116 can employ a rolling average technique in which the amount displayed at any given time is dependent on the amounts received over a previous period of time (e.g., 3 or 5 seconds).

A set of headings 320 are also displayed for processor usage list 312, memory usage list 314, disk I/O usage list 316, and network usage list 318. Headings 320 include a heading for each resource, and for each resource identify an overall amount of usage of the resource by all (or greater than a threshold number of) processes running on the device. For example, the heading 320 for disk I/O usage list 316 indicates that the overall usage of the disk I/O resource by the running processes is 9% of the disk I/O resource capacity. The resource usage in headings 320 can be displayed using the same data units for all resources or different data units for different resources analogous to the discussion above regarding the display of resource usage in lists 312-318.

The overall resource usages identified in headings 320 can be determined in a variety of different manners. In one or more embodiments, the operating system (e.g., operating system 112 of FIG. 1) includes one or more modules that track an amount of each resource used, and process management module 116 obtains the amounts of resource usage from these one or more modules. Alternatively, the overall resource usages can be determined in other manners, such as by adding together the resource usages by the various processes. The determined resource usage amounts themselves can be displayed or alternatively used to calculate the value that is displayed (e.g., using a rolling average technique).

In one or more embodiments, in addition to displaying the amount of resource usage for each of the processes, different resource usages can be color-coded to indicate how much of a resource is being used by a process. This color-coding can be a heat map, which is a graphical representation of data where the values taken by a variable are represented as "intensities" (a combination of decreasing luminosity and increasing saturation). This can be visually manifested by different colors or shades. The use of a heat map allows for quick visual identification of resources and which applications are having the most or least impact on the resources.

The different colors for this color-coding can be, for example, different intensities of a similar color (e.g., orange or red), with more intense colors indicating higher usage than less intense colors. These different colors can be used in different ways, such as displaying the amounts of resource usage for each process in these different colors, highlighting the amounts of resource usage for each process using these different colors, surrounding (e.g., in a table cell) the amounts of resource usage for each process using these different colors, and so forth.

Table I illustrates an example of color intensities that can be used for different resource usage amounts. In the example of Table I, resource usage amounts are determined as a percentage of resource capacity used, and lower numbered intensities are less intense than higher numbered intensities (e.g., intensity 1 is less intense than intensity 5). The difference in intensities between different intensity values is typically nonlinear, but can alternatively be linear. For example, the difference in intensity between intensity 1 and intensity 2 can be the same as the difference in intensity between intensity 6 and intensity 7, or the differences can be different (e.g., the difference in intensity between intensity 1 and intensity 2 may be less than the difference in intensity between intensity 6 and intensity 7). It should be noted that Table I is an example of color intensities that can be used, but that any number of intensities can be used, any level of granularity can be used, and so forth.

TABLE I

| % of Resource Capacity Used | Intensity |
|---|---|
| 0 | Intensity 1 |
| 1-9 | Intensity 2 |
| 10-19 | Intensity 3 |
| 20-39 | Intensity 4 |
| 40-59 | Intensity 5 |
| 60-79 | Intensity 6 |
| 80-99 | Intensity 7 |
| 100 | Intensity 8 |

Alternatively, rather than color-coding based on the percentage of the total resource capacity used, the color-coding can be based on other measurements, such as the relative usage across processes. For example, if one process were using 10 times the resources of another process, then that one process would have a different intensity or color than the other process to indicate this large difference in usage of the resource by the processes relative to one another.

In other embodiments, rather than displaying the amount of resource usage for each of the processes and using different colors to indicate how much of a resource is being used by a process, no amount of resource usage for the processes may be displayed. The different colors alone can be displayed (e.g., surrounding where the amount would be displayed or in a table cell where the amount would be displayed) to indicate how much of a resource is being used.

The ordering of processes in list of processes 302 can be determined in a variety of different manners. In one or more embodiments, processes are grouped according to process type. The process types can be application process, background process, and operating system process, although other process types can alternatively be used. Application processes refer to processes that are visible to the user while running, such as a process displaying a UI, a process displaying data in a task bar or tool bar, gadgets, and so forth. Background processes refer to processes that are not visible to the user while running—no visual representation of the processes is displayed by the device. Operating system processes refer to operating system components that do not run third party code. However, it should be noted that different criteria can alternatively be used to determine whether a process is an application process, background process, or operating system process.

Application processes are displayed first, followed by background processes, followed by operating system processes, although other orderings can alternatively be used. As illustrated in expanded process management view 300, an indication of the process types as well as the number of processes of each type can be displayed. For example, "Applications (5)" can be displayed to identify the processes of the application process type, and that there are five processes of the application process type. These indications of process types can optionally be contracted (e.g., so that the process type indication is displayed but identifiers of the processes of that process type are not displayed) or expanded (e.g., so that both the process type and identifiers of the processes of that process type are displayed). A user selection to expand or contract a process type indication can be received in a variety of different manners, such as selection of the process type indication, selection of an arrow or other icon displayed adjacent to the process identifier, selection of a menu item, and so forth.

Within each group, processes are displayed alphabetically by process identifier. Alternatively other orderings can be used to display process identifiers within groups, such as based on when the process began executing, the amount of a resource that is used by a process, and so forth. This ordering can optionally be user-selectable.

In one or more embodiments, processes 302 in expanded process management view 300 can be sorted according to various criteria, such as those indicated in headings 320. For example, a user can sort processes 302 by name, processor usage, memory usage, disk I/O usage, network usage, and so forth. Which criteria to sort on can be identified in different manners, such as by user selection of one of the headings 320 (e.g., the user touches "Name" in heading 320), user selection of a menu option, and so forth. In response to selection of the name criteria, processes 302 are displayed in groups as discussed above. In response to selection of another criteria (e.g., memory usage), the processes are broken up and displayed in order based on the selected criteria (e.g., from highest to lowest memory usage, from lowest to highest memory usage, etc.) rather than in groups. If the name criteria were to be selected again, then processes 302 are again displayed in groups as discussed above.

When a program is run on a device, it can be run as any number of related processes. Process management module 116 identifies these different related processes and displays them together under a common process identifier. By displaying these related processes together, the expanded process management view provides an indication to a user of the device of all the processes that will be terminated if a particular process identifier is selected for termination.

Each process 302 can include one or more windows, tabs, and/or services. A window refers to a displayed window within which a process can present data. For example, a word processing process may include multiple windows, and have a different document for editing displayed in each window. A tab refers to different displays for the window, and a process can display different information within different tabs. For example, a Web browser process may include multiple tabs in a window, and have a different Web page displayed in each tab. A service refers to a module or set of instructions that provides functionality used by a process. For example, a communication process may include a cryptographic service to encrypt data that is sent and decrypt data that is received.

When a program is run or executed, a process is launched that is an executing instantiation of that program. The process that is launched is also referred to herein as a frame process. A process (or window of a process) can optionally have one or more additional processes launched by the process. For example, a window of a frame process can launch multiple tab processes. Thus, there can be a parent/child relationship between processes, windows, tabs, and services. Each process, window, tab, and service can be a parent, and can include one or more children that are processes, windows, tabs and/or services. A process, window, tab, or service that includes (e.g., displays) or launches another process, window, tab, or service is referred to as a parent, and that other process, window, tab, or service that was included or launched by the parent is referred to as a child. It should be noted that a process, window, tab, or service can be both a parent to one or more other processes, windows, tabs, or services, and also be a child of another process, window, tab, or service.

In one or more embodiments, process management module 116 enumerates the frame processes being managed by the operating system. For each frame process, process management module 116 then identifies the windows and/or services associated with the frame process. Process management module 116 then identifies the tabs or other windows (e.g., task bar or tool bar windows) associated with those windows.

Process management module 116 can identify the different windows, tabs, and/or services (if any) for each process 302 in other manners. In one or more embodiments, process management module 116 queries each process, requesting an identification of the different windows, tabs, and/or services that that process includes. In response, the process returns to module 116 an indication of the different windows, tabs, and/or services that that process includes. In other embodiments, process management module 116 obtains an indication of the different windows, tabs, and/or services included in each process from another module or component of the operating system that is aware of the different windows, tabs, and/or services included in each process. In other embodiments, process management module 116 accesses a database or other record (e.g., maintained by the operating system) of the different windows, tabs, and/or services that are included in each process and obtains the identification of the different windows, tabs, and/or services included in each process from this database or record.

All of the processes, windows, tabs, and/or services that are related to one another via a parent/child relationship are associated with one another and are displayed as associated with a process identifier 302. The process identifier 302 identifies a frame process, and the processes, windows, tabs, and/or services related to the frame process are displayed as associated with the process identifier 302. The processes, windows, tabs, and/or services related to the frame process can be displayed as associated with the process identifier 302 in different manners, such as by displaying identifiers of the processes, windows, tabs, and/or services related to the frame process below the process identifier in list of identifiers 302.

Figure 4:
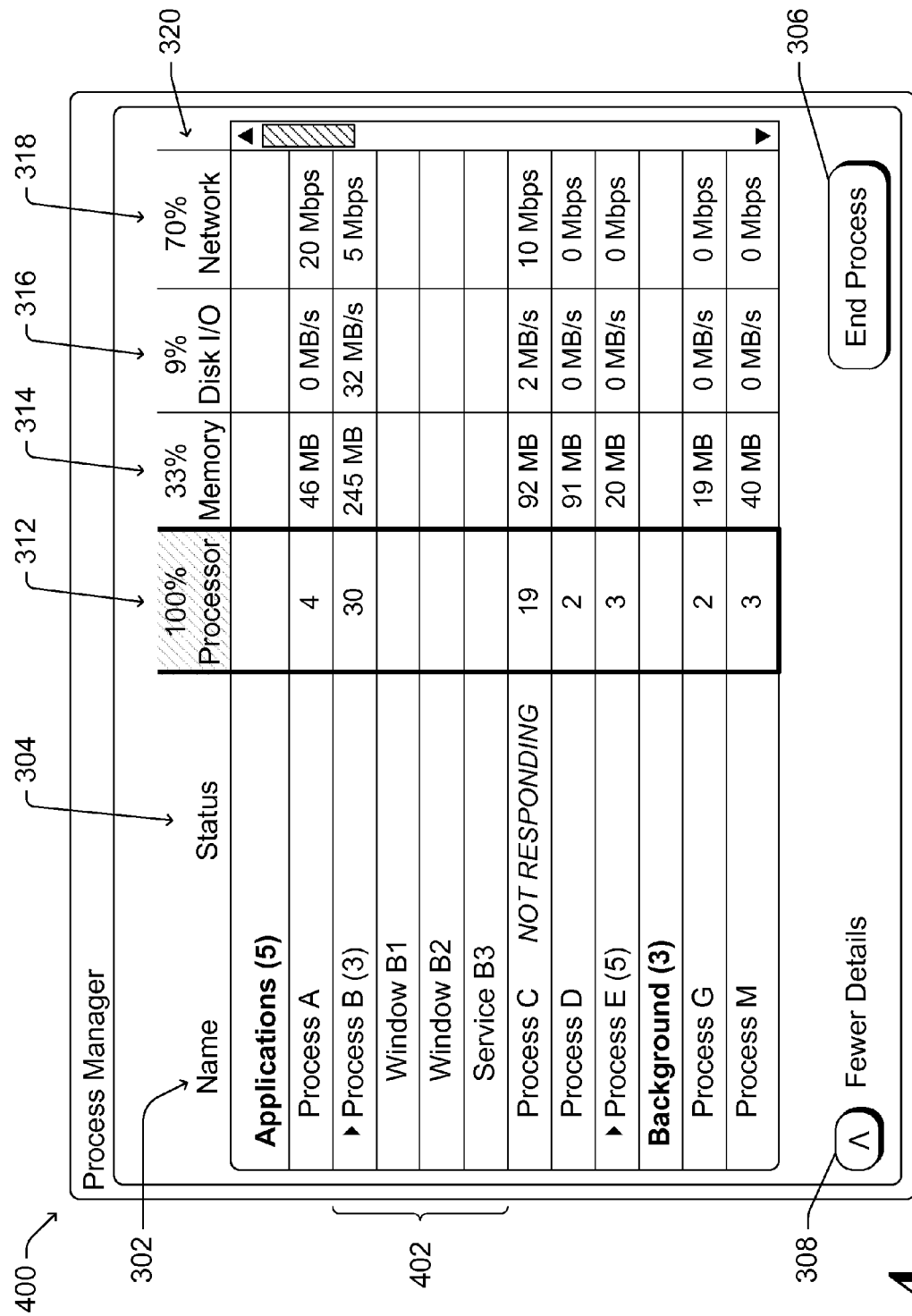
FIG. 4 illustrates another example expanded process management view in accordance with one or more embodiments.

FIG. 4 illustrates another example expanded process management view 400 in accordance with one or more embodiments. Expanded process management view 400 is similar to and displays information as discussed above with respect to expanded process management view 300. However, expanded process management view 400 includes an expanded process identifier 402. As illustrated, the "Process B (3)" identifier is expanded to identify two related windows and a related service:

Window B1, Window B2, and Service B3. The user of the device can thus readily see that if he or she selects to terminate Process A, that all three of Window B1, Window B2, and Service B3 will be terminated.

In one or more embodiments the resource usage for all related processes, windows, tabs, and/or services is displayed as a combined value. For example, rather than displaying resource usage for Window B1, Window B2, and Service B3 individually, a combined resource usage for Window B1, Window B2, and Service B3 is displayed. Alternatively, if information regarding separate amounts of resource usage for the individual related processes, windows, tabs, and/or services is available, then individual resource usages for each of the related processes, windows, tabs, and/or services can be displayed.

In one or more embodiments, process identifiers 302 of FIG. 3 and/or process identifiers 402 of FIG. 4 are displayed including an indication of how many different processes are related to the identified process. For example, "Process B (3)" can be displayed to identify that the process with the identifier "Process B" actually has three different related processes, windows, tabs, and/or services. A user selection to expand a process identifier 302 can also be received, in response to which identifiers of these related processes, windows, tabs, and/or services are displayed. Similarly, a user selection to contract a processor identifier 302 can also be received, in response to which identifiers of these related processes, windows, tabs, and/or services are no longer displayed. The user selection to expand and/or contract a process identifier 302 and/or process identifier 302 can be made in a variety of different manners, such as selection of an arrow or other icon displayed adjacent to the process identifier, selection of a menu item, and so forth.

Figure 5:
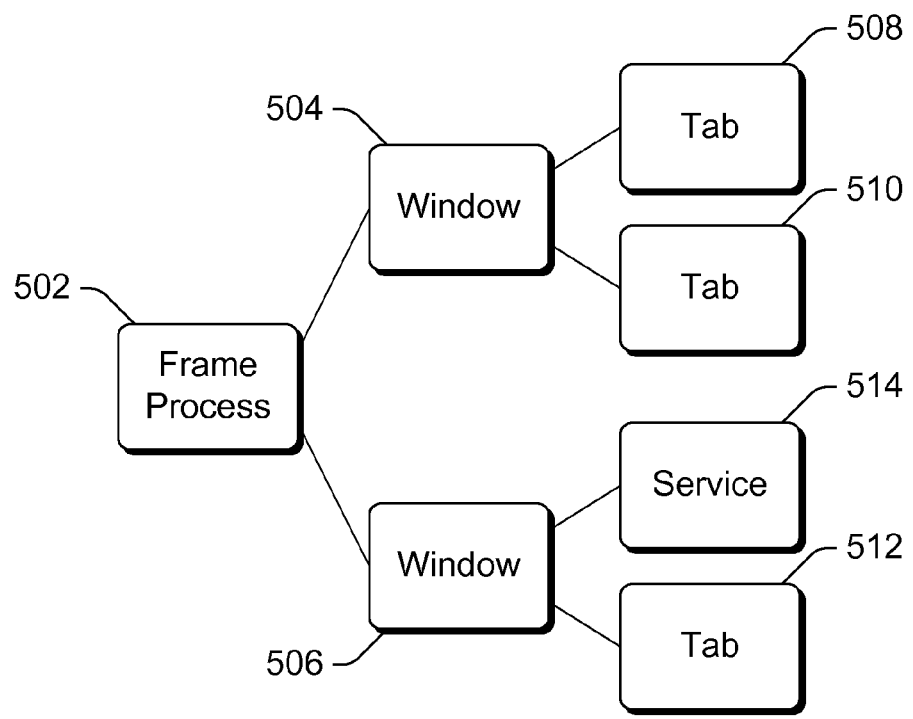
FIG. 5 illustrates an example parent/child relationship in accordance with one or more embodiments.

FIG. 5 illustrates an example parent/child relationship in accordance with one or more embodiments. In FIG. 5, a frame process 502 displays two windows 504 and 506. Window 504 includes two tabs 508 and 510. Window 506 includes a tab 512 and a service 514. As each of tabs 508, 510, and 512, service 514, windows 504 and 506, and frame process 502 is related to at least one other of tabs 508, 510, and 512, service 514, windows 504 and 506, and frame process 502 by way of a parent/child relationship, each of tabs 508, 510, and 512, service 514, windows 504 and 506, and frame process 502 are displayed as associated with one another in the expanded process management view. For example, an identifier of frame process 502 can be displayed as a process identifier, and each of tabs 508, 510, and 512, service 514, windows 504 and 506 can be displayed as related to frame process 502.

Figure 6:
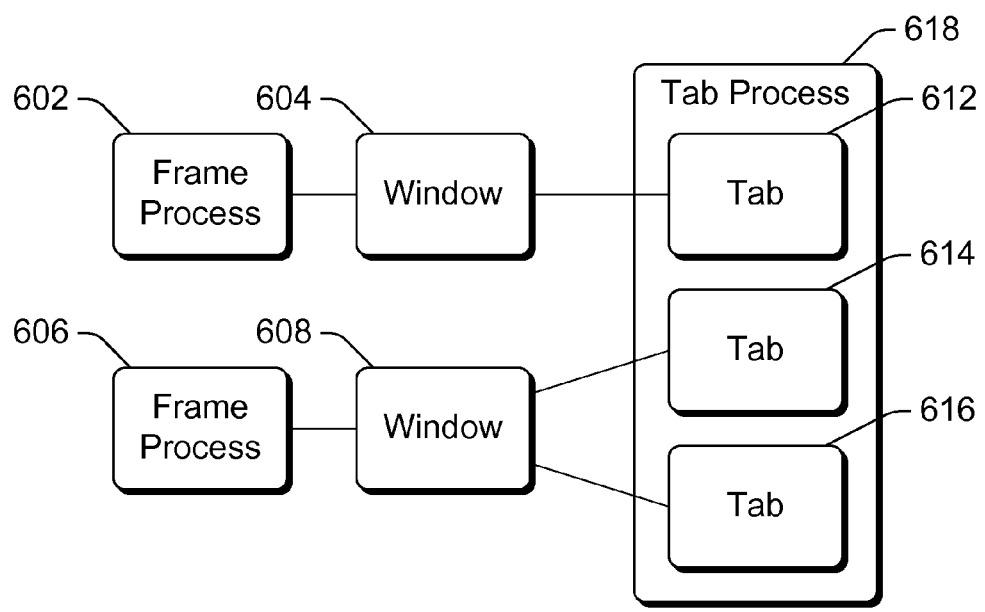
FIG. 6 illustrates another example parent/child relationship in accordance with one or more embodiments.

FIG. 6 illustrates another example parent/child relationship in accordance with one or more embodiments. In FIG. 6, a frame process 602 includes a window 604, and a frame process 606 includes a window 608. Window 604 includes a tab 612, and window 608 includes tabs 614 and 616. However, tabs 612, 614, and 616 are displayed by a tab process 618 that is shared by both frame process 602 and frame process 606. As each of tabs 612, 614, and 616, windows 604 and 608, and frame process 602 and 606 is related to at least one other of tabs 612, 614, and 616, windows 604 and 608, and frame process 602 and 606 by way of a parent/child relationship, each of tabs 612, 614, and 616, windows 604 and 608, and frame process 602 and 606 are displayed as associated with one another in the expanded process management view. For example, an identifier of one of frame process 602 and 606 can be displayed as a process identifier, and each of tabs 612, 614, and 616, windows 604 and 608, and the other of frame process 602 and 606 can be displayed as related to the one of frame process 602 and 606. By way of another example, an identifier of both frame process 602 and 606 can be displayed as a process identifier, and each of tabs 612, 614, and 616, windows 604 and 608 can be displayed as related to the frame processes 602 and 606.

Figure 7:
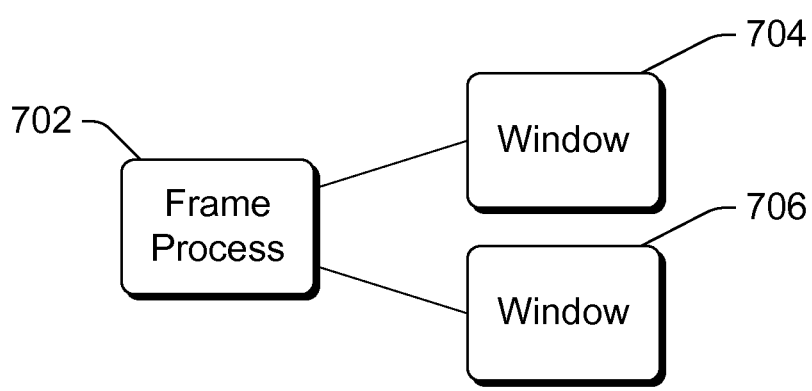
FIG. 7 illustrates another example parent/child relationship in accordance with one or more embodiments.

FIG. 7 illustrates another example parent/child relationship in accordance with one or more embodiments. In FIG. 7, a frame process 702 includes a window 704 and a window 706. As each of windows 704 and 706, and frame process 702 is related to at least one other of windows 704 and 706, and frame process 702 by way of a parent/child relationship, each of windows 704 and 706, and frame process 702 are displayed as associated with one another in the expanded process management view. For example, an identifier of frame process 702 can be displayed as a process identifier, and each of windows 704 and 706 can be displayed as related to frame process 702.

Returning to FIG. 3, in one or more embodiments process management module 116 identifies one of the resources (e.g., processor, memory, disk I/O, or network) that is expected to be causing slow performance of the device. It should be noted that the resource causing slow performance may be, but is not necessarily, the resource having the highest usage indicated in headings 320. Process management module 116 can use a variety of different techniques to identify which resource is expected to be causing slow performance of the device, examples of which are discussed in more detail below.

Process management module 116 indicates via expanded process management view 300 which of the resources is expected to be causing slow performance of the device. Generally, for the resource that is expected to be causing slow performance of the device, the display of the identifier of that resource in headings 320 and/or the list indicating usage of that resource is altered, highlighted, or otherwise visually called out to indicate that that resource is the resource that is expected to be causing slow performance of the device. In one or more embodiments, module 116 indicates which of the resources is expected to be causing slow performance of the device by highlighting an identifier of the resource in headings 320, and also outlining the list (e.g., with a thicker line than lines in the other lists) indicating usage of that resource. For example, if the processor were to be identified as the resource that is expected to be causing slow performance of the device, then the identifier of the processor in headings 320 is highlighted and processor usage list 312 is outlined with a thick line (e.g., 2 or 3 times thicker than other lines used in lists 314-318) as illustrated in FIG. 3.

In one or more embodiments, various different contention determination techniques are used for different resources to identify which resource is expected to be causing slow performance of the device. For each resource, the contention determination technique corresponding to that resource is used to determine whether that resource is expected to be causing slow performance of the device. Typically only one of the contention determination techniques indicate the corresponding resource is expected to be causing slow performance of the device. However, situations may arise in which multiple contention determination techniques indicate the corresponding resources are expected to be causing slow performance of the device. In such situations, one of these corresponding resources is selected as the resource that is expected to be causing slow performance of the device (e.g., the resource having the largest overall usage identified in headings 320, the resource having a corresponding contention determination technique report a higher contention value than other contention determination techniques, etc.). Alternatively, the multiple corresponding resources can be identified as the resources that are expected to be causing slow performance of the device (e.g., two or more lists 312-318 can be outlined with a thick line).

The processor contention determination technique uses one or more of various performance counters to determine whether processor contention is expected to be causing slow performance of the device. Processes can be executed as multiple threads, and these performance counters can monitor performance of threads, processes, or other information related to threads and/or processes. If the performance counters satisfy (e.g., equal or exceed) a threshold value, then the processor is determined as expected to be causing slow performance of the device. These performance counters can be implemented by process management module 116 of FIG. 1 and/or other modules of the operating system (e.g., operating system 112 of FIG. 1).

In one or more embodiments, the processor contention determination technique uses a performance counter that tracks the amount of time that a processor has one or more threads in its ready queues (threads ready and waiting to be executed). The performance counter can optionally track only threads of a particular one or more priorities (e.g., normal or higher priority threads may be tracked, but low priority threads may not be tracked). The value of the performance counter is divided by a measurement period (e.g., 3 to 5 seconds) to generate a resultant value that indicates for what percentage of the measurement period the processor had threads in its ready queues. If the resultant value satisfies (e.g., equals or exceeds) a threshold amount (e.g., 0.9), then the processor is determined as expected to be causing slow performance of the device. This resultant value can be a contention value for the processor resource.

In other embodiments, the processor contention determination technique uses performance counters that track for each process a percentage of the processor time used by that process. The values of the performance counters for all processes (or optionally only processes of a particular one or more priorities, such as normal or higher priority processes) are added together, and the resultant value is compared to a threshold amount. If the resultant value satisfies (e.g., equals or exceeds) a threshold amount (e.g., 95%), then the processor is determined as expected to be causing slow performance of the device. This resultant value can be a contention value for the processor resource.

In other embodiments, the processor contention determination technique uses a performance counter that tracks a percentage of the processor time used by all threads of a particular one or more priorities (e.g., normal or higher priority processes). If the value of the performance counter satisfies (e.g., equals or exceeds) a threshold amount (e.g., 95%), then the processor is determined as expected to be causing slow performance of the device. This value of the performance counter can be a contention value for the processor resource.

In other embodiments, the processor contention determination technique uses performance counters that track for each thread a percentage of the processor time used by that thread and for each thread the priority of that thread. The values of the performance counters for threads of a particular one or more priorities (such as normal or higher priority threads) are added together, and the resultant value is compared to a threshold amount. If the resultant value satisfies (e.g., equals or exceeds) a threshold amount (e.g., 95%), then the processor is determined as expected to be causing slow performance of the device. This resultant value can be a contention value for the processor resource.

The memory contention determination technique uses one or more of various metrics to determine whether memory contention is expected to be causing slow performance of the device. If one or more metrics are below (e.g., are equal to or less than) a threshold value, then the memory is determined as expected to be causing slow performance of the device. These metrics can be measured by process management module 116 of FIG. 1 and/or other modules of the operating system (e.g., operating system 112 of FIG. 1).

In one or more embodiments, the memory contention determination technique uses a metric that is the average lifetime of pages on a standby list over a particular period of time (e.g., the previous minute). The pages on the standby list are pages of memory that store cached data, and although can be associated with a process can also be allocated to and associated with various other processes if desired (e.g., by a memory manager). A value that is the average lifetime of pages on the standby list is obtained and if the value is below (e.g., is equal to or less than) a threshold amount, then the processor is determined as expected to be causing slow performance of the device. Multiple threshold amounts can be used. For example, if the value is less than or equal to one threshold value (e.g., 15 minutes), then the memory resource is determined to be the resource that is expected to be causing slow performance of the device only if no other resource (e.g., processor, disk I/O, or network) is also determined as being the resource that is expected to be causing slow performance of the device. However, if the value is less than or equal to another threshold value (e.g., 5 minutes), then the memory resource is determined to be the resource that is expected to be causing slow performance of the device regardless of whether any other resource (e.g., processor, disk I/O, or network) is also determined as being the resource that is expected to be causing slow performance of the device.

The disk I/O contention determination technique uses one or more of various metrics to determine whether disk I/O contention is expected to be causing slow performance of the device. If one or more metrics satisfy (e.g., equal or exceed) a threshold value, then the disk I/O is determined as expected to be causing slow performance of the device. These metrics can be measured by process management module 116 of FIG. 1 and/or other modules of the operating system (e.g., operating system 112 of FIG. 1).

In one or more embodiments, the disk I/O contention determination technique uses a metric that is overall disk utilization. The overall disk utilization refers to a percentage of the disk I/O capacity (the total bandwidth or largest amount of data that can be input to and/or output from the disk over a particular period of time). If the overall disk utilization satisfies (e.g., equals or exceeds) a threshold amount (e.g., 95%) when averaged over a particular period of time (e.g., ten seconds), and if over each of two previous amounts within that particular period of time (e.g., two five-second amounts of time) the process with the most disk I/O operations is below (e.g., is equal to or less than) another threshold amount (e.g., 85%) of the disk I/O operations in the particular period of time, then the disk I/O is determined as expected to be causing slow performance of the device. Additionally, once the disk I/O is determined as expected to be causing slow performance of the device, the determination can be maintained for at least a threshold amount of time (e.g., three seconds). The overall disk utilization averaged over a particular period of time can be a contention value for the disk I/O resource.

In other embodiments, the disk I/O contention determination technique uses performance counters that track for each thread a percentage of the disk time used by that thread and for each thread the I/O priority of that thread. The values of the performance counters for threads of a particular one or more priorities (such as normal or higher priority threads) are added together, and the resultant value is compared to a threshold amount. If the resultant value satisfies (e.g., equals or exceeds) a threshold amount (e.g., 95%), then the disk is determined as expected to be causing slow performance of the device.

In other embodiments, the disk I/O contention determination technique uses a performance counter that tracks the amount of time that a disk has one or more I/O in its queues (I/Os ready and waiting to be serviced by the disk). The performance counter can optionally track only threads of a particular one or more I/O priorities (e.g., normal or higher priority threads may be tracked, but low priority threads may not be tracked). The value of the performance counter is divided by a measurement period (e.g., 3 to 5 seconds) to generate a resultant value that indicates for what percentage of the measurement period the disk had I/Os waiting in its queue. If the resultant value satisfies (e.g., equals or exceeds) a threshold amount (e.g., 0.9), then the disk is determined as expected to be causing slow performance of the device. This resultant value can be a contention value for the disk resource.

The network contention determination technique uses one or more of various metrics to determine whether network contention is expected to be causing slow performance of the device. If one or more metrics satisfy (e.g., equal or exceed) a threshold value, then the network is determined as expected to be causing slow performance of the device. These metrics can be measured by process management module 116 of FIG. 1 and/or other modules of the operating system (e.g., operating system 112 of FIG. 1).

In one or more embodiments, the network contention determination technique uses a metric that is overall network interface utilization. The overall network interface utilization refers to a percentage of the network interface capacity (the total bandwidth or largest amount of data that can be received and/or sent by the network interface over a particular period of time). If the overall network interface utilization satisfies (e.g., equals or exceeds) a threshold amount (e.g., 85%) when averaged over a particular period of time (e.g., five seconds), and the process with the most network usage operations is below (e.g., is equal to or less than) another threshold amount (e.g., 80%) of the overall bandwidth of the network interface that is used, then the network is determined as expected to be causing slow performance of the device. The overall network interface utilization averaged over a particular period of time can be a contention value for the network resource.

In situations in which a device includes multiple network interfaces, the more-utilized network interface is identified and the network contention determination technique is applied to the more-utilized network interface. The more-utilized network interface can be determined by determining a usage value for each of the multiple network interfaces. The usage value for a network interface is determined by dividing a value of a performance counter indicating the total number of bytes per second the network interface is transferring (received and/or sent) by a value of a performance counter indicating a current bandwidth of the network interface (the largest amount of data that can be received and/or sent by the network interface per second). The network interface having the largest usage value is determined to be the more-utilized network interface. When applying the network contention determination technique for the more-utilized network interface, network resource usage by only those processes that are using the more-utilized network interface is considered (network resource usage by processes not using the more-utilized network interface is not used by the network contention determination technique). Which processes are using which network interfaces can be determined in different manners, such as by identifying the network subnet used by the network interface, and identifying processes sending and/or receiving data for that network subnet as using that network interface.

In the discussions herein, particular simplified and expanded process management views are illustrated. It should be noted that these illustrations include example layouts, and that other layouts can alternatively be used. For example, rather than having lists of process identifiers, lists of status indications, and so forth laid out in columns as illustrated in FIGS. 2, 3, and 4, the lists can be laid out in rows.

The process management views techniques discussed herein support various usage scenarios. A user can easily switch between views, allowing the user to select whether he or she desires the less-detailed view of the simplified process management view, or the more-detailed view of the expanded process management view. Additionally, because the expanded process management view identifies all of the windows, tabs, services, and/or processes that will be terminated if a particular process is terminated, a user can readily see what the results will be (in terms of windows, tabs, services, and/or processes that are terminated) if he or she terminates a particular process. Furthermore, because the expanded process management view displays resource usage on a per resource basis for each process (as well as related windows, tabs, services, and/or other processes), and can be color-coded, a user can readily identify which processes are using more of particular resources than other processes. In addition, because the expanded process management view displays an indication of a resource that is expected to be causing slow performance of the device, a user can readily identify which list of resource usages to pay attention to in selecting one or more processes to terminate.

Figure 8:
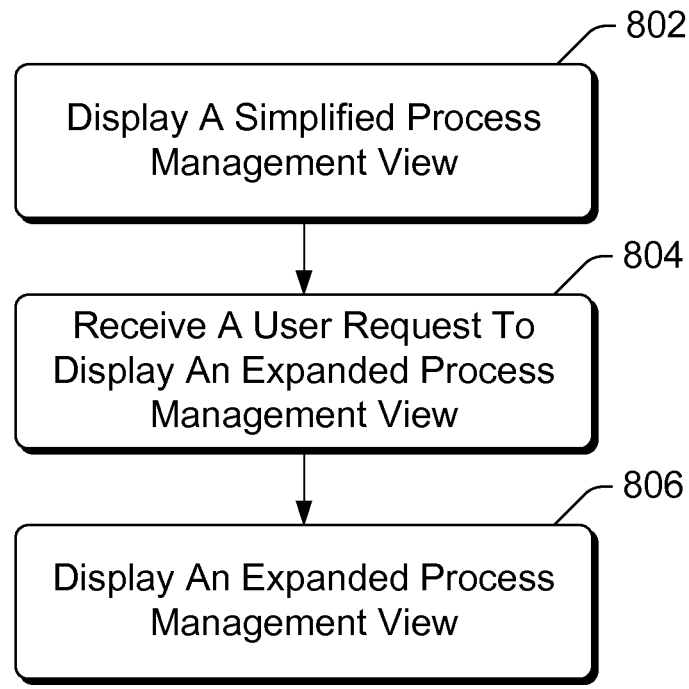
FIG. 8 is a flowchart illustrating an example process for a device implementing the process management views in accordance with one or more embodiments.

FIG. 8 is a flowchart illustrating an example process 800 for a device implementing the process management views in accordance with one or more embodiments. Process 800 is carried out by a device, such as device 100 of FIG. 1, and can be implemented in software, firmware, hardware, or combinations thereof. Process 800 is shown as a set of acts and is not limited to the order shown for performing the operations of the various acts. Process 800 is an example process for implementing the process management views; additional discussions of implementing the process management views are included herein with reference to different figures.

In process 800, a simplified process management view is displayed (act 802). The simplified process management view displays process identifiers of multiple processes on the device, and for each of the multiple processes that is not responding an indication that the process is not responding as discussed above.

A user request is received to display an expanded process management view (act 804). The user request can be received in a variety of different manners as discussed above, such as selection of a button displayed as part of the simplified process management view.

In response to the user request, an expanded process management view is displayed (act 806). The expanded process management view displays process identifiers of the multiple processes, for each of the multiple processes that is not responding an indication that the process is not responding, and for each of multiple resources of the device a usage of the resource by each of the multiple processes as discussed above. Various additional information can also be displayed in the expanded process management view as discussed above.

Figure 9:
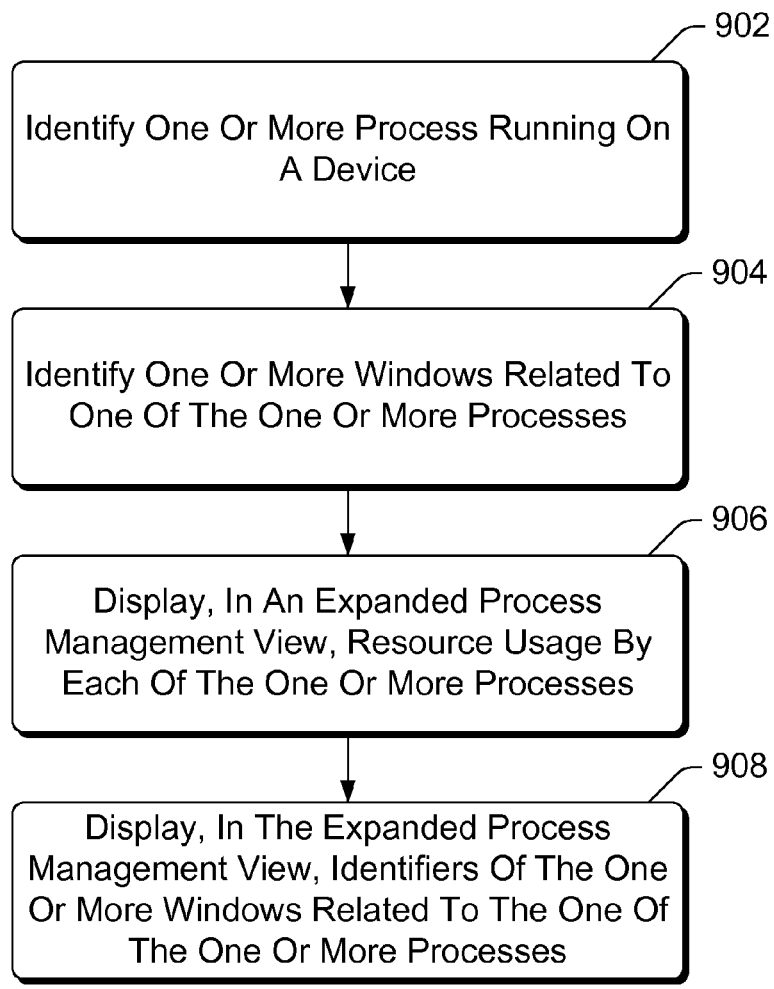
FIG. 9 is a flowchart illustrating another example process for a device implementing the process management views in accordance with one or more embodiments.

FIG. 9 is a flowchart illustrating another example process 900 for a device implementing the process management views in accordance with one or more embodiments. Process 900 is carried out by a device, such as device 100 of FIG. 1, and can be implemented in software, firmware, hardware, or combinations thereof. Process 900 is shown as a set of acts and is not limited to the order shown for performing the operations of the various acts. Process 900 is an example process for implementing the process management views; additional discussions of implementing the process management views are included herein with reference to different figures.

In process 900, one or more process running on a device are identified (act 902). These processes can be identified in a variety of different manners as discussed above. These one or more processes running on the device can include processes that are not responding, processes that are suspended (e.g., not being scheduled for execution by a processor), process that are running normally, and so forth.

Additionally, one or more windows related to one of the one or more processes are identified (act 904). These windows can be identified in a variety of different manners as discussed above.

In an expanded process management view, resource usage by each of the one or more processes is displayed (act 906). Resource usage for various resources can be displayed using various data units as discussed above, and can be color-coded as discussed above.

Additionally, in the expanded process management view identifiers of the one or more windows related to the one of the one or more processes is displayed (act 908). The identifiers of the one or more windows are displayed as associated with the process identifier of the one process. Identifiers of various additional tabs and/or services can also be identified and displayed in the expanded process management view as discussed above.

Figure 10:
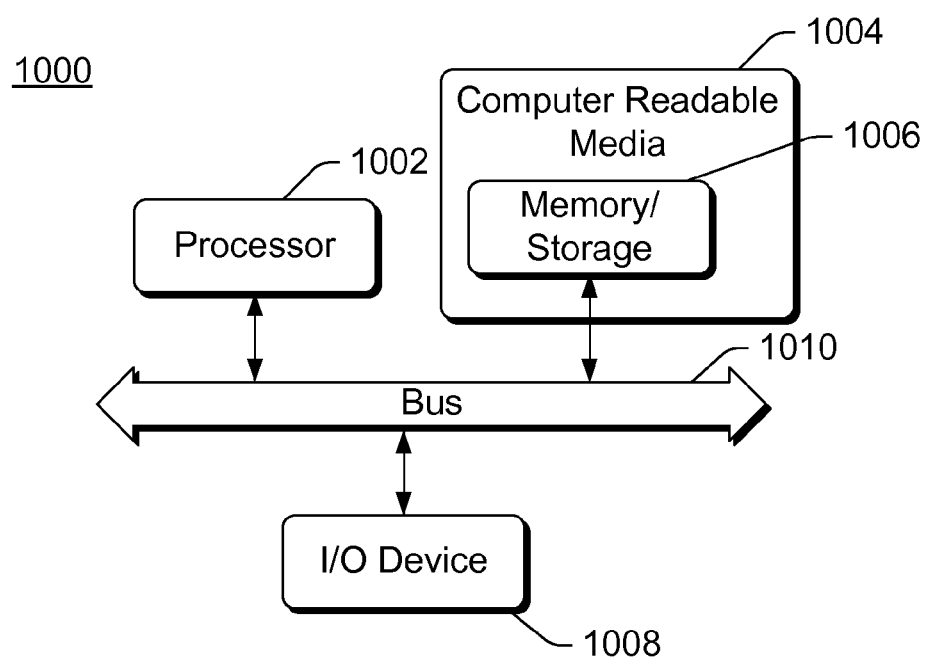
FIG. 10 illustrates an example computing device that can be configured to implement the process management views in accordance with one or more embodiments.

FIG. 10 illustrates an example computing device 1000 that can be configured to implement the process management views in accordance with one or more embodiments. Computing device 1000 can be, for example, device 100 of FIG. 1.

Computing device 1000 includes one or more processors or processing units 1002, one or more computer readable media 1004 which can include one or more memory and/or storage components 1006, one or more input/output (I/O) devices 1008, and a bus 1010 that allows the various components and devices to communicate with one another. Computer readable media 1004 and/or one or more I/O devices 1008 can be included as part of, or alternatively may be coupled to, computing device 1000. Processor 1002, computer readable media 1004, one or more of devices 1008, and/or bus 1010 can optionally be implemented as a single component or chip (e.g., a system on a chip). Bus 1010 represents one or more of several types of bus structures, including a memory bus or memory controller, a peripheral bus, an accelerated graphics port, a processor or local bus, and so forth using a variety of different bus architectures. Bus 1010 can include wired and/or wireless buses.

Memory/storage component 1006 represents one or more computer storage media. Component 1006 can include volatile media (such as random access memory (RAM)) and/or nonvolatile media (such as read only memory (ROM), Flash memory, optical disks, magnetic disks, and so forth). Component 1006 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1002. It is to be appreciated that different instructions can be stored in different components of computing device 1000, such as in a processing unit 1002, in various cache memories of a processing unit 1002, in other cache memories of device 1000 (not shown), on other computer readable media, and so forth. Additionally, it is to be appreciated that the location where instructions are stored in computing device 1000 can change over time.

One or more input/output devices 1008 allow a user to enter commands and information to computing device 1000, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 10. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the process management views techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   displaying a first process management view on a device, the first process management view displaying:
   process identifiers of multiple processes on the device;
   for each of the multiple processes that is not responding, an indication that the process is not responding; and
   an element selectable to indicate a request to provide additional details of the multiple processes, the selectable element being displayed in the first process management view independent of a user input;
   receiving, via the selectable element, a user request;
   displaying, in response to the user request, a second process management view, the second process management view displaying:
   the process identifiers of the multiple processes,
   for each of the multiple processes that is not responding an indication that the process is not responding,
   for each of multiple resources of the device a usage of the resource by each of the multiple processes, and
   as associated with a process identifier, one or more windows, one or more tabs, or one or more services related to the process identified by the process identifier; and
   replacing, in response to the user request, the first process management view with the second process management view.

2. A method as recited in claim 1, the first process management view further displaying a button that can be selected to terminate one of the multiple processes.

3. A method as recited in claim 1, the second process management view further displaying, for each of the multiple resources, an overall resource usage by the multiple processes.

4. A method as recited in claim 3, the overall resource usage by the multiple processes for each of the multiple resources being displayed as a percentage of a resource capacity used, and for each of the multiple resources the usage of the resource by each of the multiple processes being displayed as a data unit being dependent on the resource.

5. A method as recited in claim 3, the displaying the second process management view further comprising:
   displaying multiple columns, each of the multiple columns corresponding to one of the multiple resources;
   displaying, as a heading for each of the multiple resources, the overall resource usage by the multiple processes for the resource; and
   displaying, in the column of each of the multiple resources, the usages of the resource by the multiple processes.

6. A method as recited in claim 1, the displaying the second process management view further comprising displaying the usage of each of the multiple resources by each of the multiple processes color-coded to indicate how much of each resource is being used by each of the multiple processes.

7. A method as recited in claim 1, further comprising:
   identifying one of the multiple resources that is expected to be causing slow performance of the device, the identifying being based on:
   analyzing performance of the multiple processes and/or threads of the multiple processes using a processor contention determination technique,
   analyzing usage of memory of the device using a memory contention determination technique,
   analyzing utilization of a disk of the device using a disk input/output (I/O) contention determination technique, or
   analyzing utilization of a network interface of the device using a network contention determination technique; and
   outlining a list of usages of the identified resource by the multiple processes.

8. A method as recited in claim 1, further comprising:
   receiving, while displaying the first process management view or the second process management view, a user request to terminate one of the multiple processes; and
   terminating, in response to the user request to terminate the one of the multiple processes, the one of the multiple processes.

9. A method as recited in claim 1, further comprising maintaining a default view that is a most recently displayed one of the first process management view and the second process management view.

10. A method comprising:
    identifying one or more processes running on a device;
    identifying, for one of the one or more processes, one or more windows within which the one process is running;
    displaying, in a first process management view, process identifiers of the one or more processes, and for each of multiple resources of the device a resource usage by each of the one or more processes; and
    for the one process, displaying, in the first process management view as associated with the process identifier of the process, identifiers of the one or more windows within which the one process is running.

11. A method as recited in claim 10, further comprising displaying the identifiers of the one or more windows in response to a user request to expand the process identifier.

12. A method as recited in claim 10, further comprising:
    identifying, for the one process, one or more tabs related to the one process; and
    for the one process, displaying, in the first process management view as associated with the process identifier of the one process, identifiers of the one or more tabs.

13. A method as recited in claim 10, further comprising:
    identifying, for the one process, one or more services related to the one process; and
    for the one process, displaying, in the first process management view as associated with the process identifier of the one process, identifiers of the one or more services.

14. A method as recited in claim 10, the displaying the process identifiers of the one or more processes further comprising grouping the one or more processes by process type.

15. A method as recited in claim 14, for each of the one or more processes, the process type of the process being application process, background process, or operating system process.

16. A method as recited in claim 14, further comprising:
    grouping the one or more processes by process type in response to a selection to sort the one or more processes by name; and
    otherwise displaying the process identifiers in an order based on particular criteria other than process name in response to a selection to sort the processes by the particular criteria.

17. A method as recited in claim 10, the displaying the resource usage by each of the multiple processes comprising displaying, for the one process, the resource usage by the one process and the one or more windows within which the one process is running as a combined value.

18. A method as recited in claim 10, further comprising:
identifying one of the multiple resources that is expected to be causing slow performance of the device;
outlining a list of usages of the identified resource by the multiple processes; and
displaying the usage of each of the multiple resources by each of the multiple processes color-coded to indicate how much of each resource is being used by each of the multiple processes.

19. A method as recited in claim 10, further comprising identifying one of the multiple resources that is expected to be causing slow performance of the device.

20. A method comprising:
displaying a first process management view on a device, the first process management view displaying process identifiers of multiple processes on the device, and for each of the multiple processes that is not responding an indication that the process is not responding;
receiving a user request to have a second process management view displayed; and
displaying, in response to the user request, the second process management view such that the second process management view replaces the first process management view, the second process management view displaying:
the process identifiers of the multiple processes,
for each of the multiple processes that is not responding an indication that the process is not responding,
for each of multiple resources of the device a usage of the resource by each of the multiple processes,
for each of one or more of the multiple processes, one or more windows, tabs, and/or services related to the process, the one or more windows, tabs, and/or services being displayed as associated with a process identifier of the process, and
outlining a list of usages of one of the multiple resources by the multiple processes, the one of the multiple resources being a resource that is expected to be causing slow performance of the device.

* * * * *